United States Patent [19]
Abe et al.

[11] Patent Number: 5,387,038
[45] Date of Patent: Feb. 7, 1995

[54] DUST-PROOFING STRUCTURE OF MINIATURE LINEAR GUIDE

[75] Inventors: Yasushi Abe; Toru Tsukada, both of Gunma, Japan

[73] Assignee: NSK Ltd., Tokyo, Japan

[21] Appl. No.: 262,867

[22] Filed: Jun. 21, 1994

[30] Foreign Application Priority Data

Jun. 21, 1993 [JP] Japan .................. 5-33339[U]

[51] Int. Cl.$^6$ .................. F16C 29/06; F16C 29/08
[52] U.S. Cl. .......................... 384/15; 384/45
[58] Field of Search .................. 384/15, 43, 44, 45

[56] References Cited

U.S. PATENT DOCUMENTS

| | | | |
|---|---|---|---|
| 4,616,885 | 10/1986 | Komiya | 384/15 |
| 4,806,022 | 2/1989 | Takahiro | 384/45 |
| 4,892,415 | 1/1990 | Katahira | 384/45 |
| 5,275,492 | 1/1994 | Shirai | 384/15 |

*Primary Examiner*—Thomas R. Hannon
*Attorney, Agent, or Firm*—Sughrue, Mion, Zinn, Macpeak & Seas

[57] ABSTRACT

A miniature linear guide provides a guide rail having load ball rolling grooves, and a slider which is made up of a slider body having load ball rolling grooves which are confronted with those of the guide rail, a circulator having non-load ball circulating paths, and a holding plate interposed between the slider body and the circulator, and a number of balls rollingly fitted in the spaces defined by the load ball rolling grooves of the slider body and the guide rail and in the non-load ball circulating paths in the circulator. The miniature linear guide has a dust-proofing structure in which both end portions of the holding plate, as viewed in the direction of length thereof, are bent at right angles, thus forming protrusions, and seal members having sealing protrusions are formed on the protrusions so that the sealing protrusions are fitted in the load ball rolling grooves of the guide rail to sealingly close gaps formed between the guide rail and the slider.

3 Claims, 3 Drawing Sheets

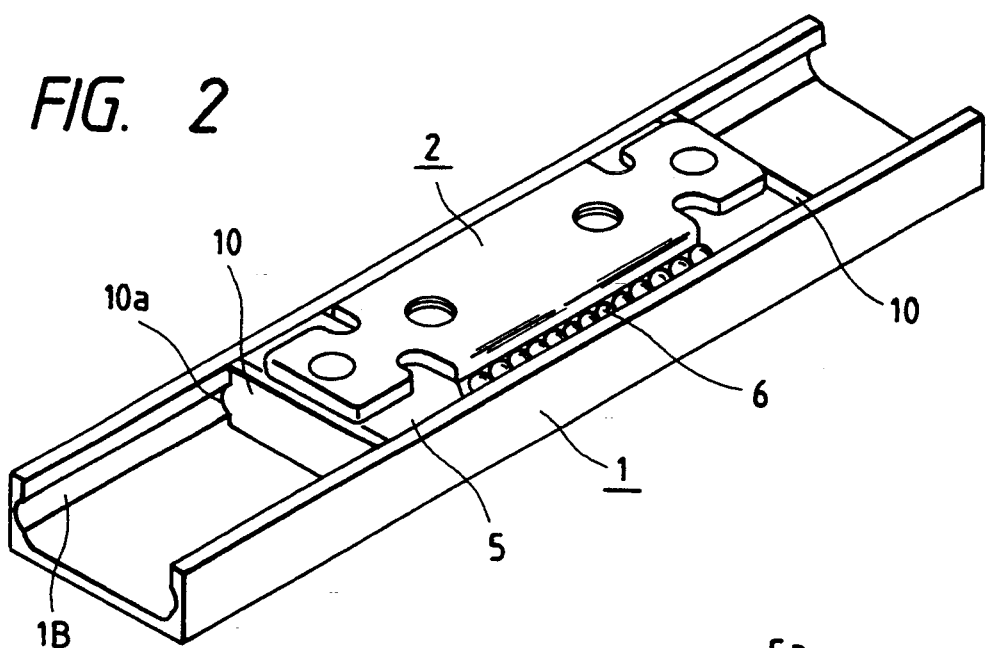
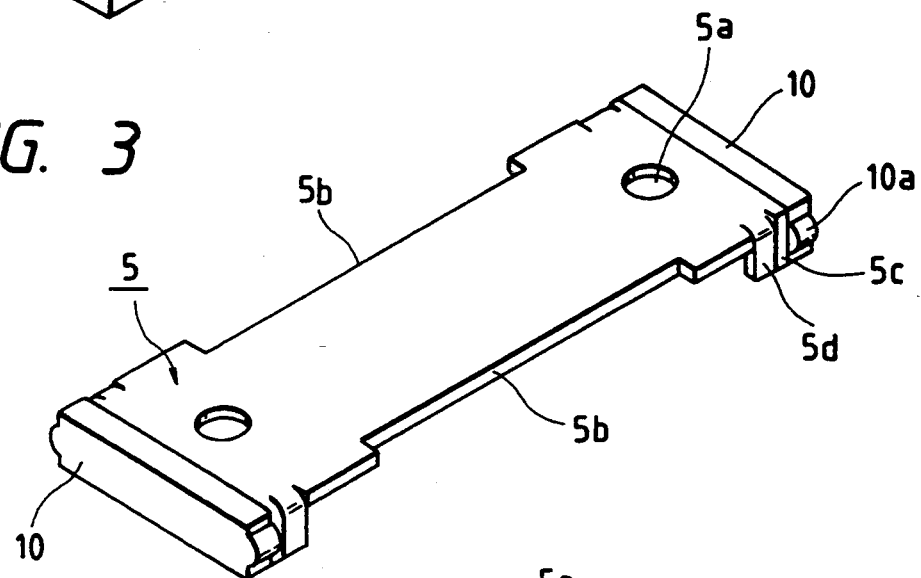
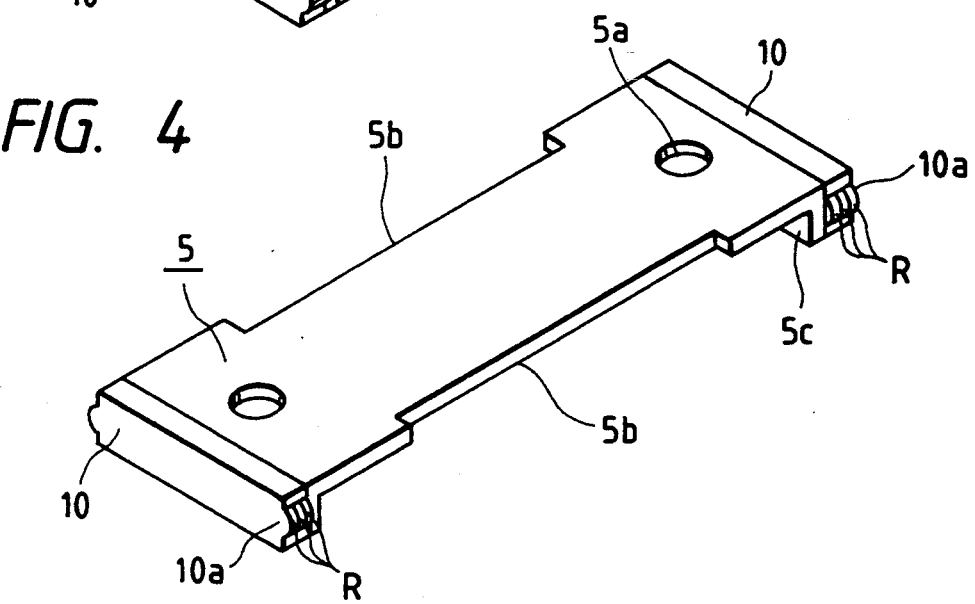

DUST-PROOFING STRUCTURE OF MINIATURE LINEAR GUIDE

BACKGROUND OF THE INVENTION

The present invention relates to a miniature linear guide of the type that a slider incorporating ball circulating paths and supported on a guide rail is axially moved relative to the guide rail through a number of balls which circulate in ball rolling grooves while being rolled, and more particularly, to a dust-proof structure for the miniature linear guide.

A conventional miniature linear guide, as shown in FIG. 5, is made up of a long guide rail 1 substantially U-shaped in section, and a slider 2 which is slidably engaged with the guide rail 1. As shown in FIG. 6, the slider 2 integrally fits a slider body 3 substantially U-shaped in section which is formed of a plate material by pressing, a circulator 4 which is formed of plastic by molding and is mounted in a concave portion of the slider body 3, and a plastic holding plate 5 which is interposed between the slider body 3 and the circulator 4. Further, the circulator 4 includes ball circulating paths.

As shown in FIG. 6, load ball rolling grooves 1B are formed in the inner surfaces of two side walls of the guide rail 1, respectively, so that they are extended axially. Load ball rolling grooves 3B are formed in the outer surfaces of two side walls of the slider body 3, respectively, so that they are extended axially and confronted with the load ball rolling grooves 1B of the guide rail 1, respectively. A number of balls 6 are fitted in the spaces defined by the load ball rolling grooves 1B and 3B and in the ball circulating paths in the circulator 4. When the slider 2 is linearly moved along the guide rail 1, the balls 6 are infinitely circulated while being rolled.

The above-described conventional miniature linear guide has been proposed with the premise that it is used in a clean atmosphere as in a clean room which is substantially free from dust. Therefore, a dust-proofing device is not provided for the miniature linear guide. Hence, if it is used in a place where the atmosphere is not clean, dust may enter it, obstructing the operation.

In addition, the conventional miniature linear guide is disadvantageous in that, during operation, the lubricant such as grease and lubricating Oil splashes out through the gaps between the guide rail 1 and the slider 2, as a result of which the miniature linear guide is not sufficiently lubricated; that is, it is reduced in service life as much.

SUMMARY OF THE INVENTION

Accordingly, an object of the present invention is to eliminate the above-described difficulties accompanying a conventional miniature linear guide.

More specifically, an object of the present invention is to provide a dust-proofing structure for a miniature linear guide which permits the use of the miniature linear guide even in a dusty atmosphere, and prevents the lubricant from splashing out of it.

The foregoing object and other objects of the present invention have been achieved by the provision of a dust-proofing structure for a miniature linear guide providing a guide rail U-shaped in section which is extended axially, the guide rail including two side walls confronted with each other in the inner surfaces of which load ball rolling grooves are formed so that the grooves are extended axially, a slider including: a slider body U-shaped in section which is wide enough to be fitted in the guide rail, the slider body including two side walls in the outer surfaces of which load ball rolling grooves are formed so as to be confronted with the load ball rolling grooves of the guide rail; a circulator having non-load ball circulating paths which are extended axially, the circulator being fitted in the slider body; and a holding plate interposed between the slider body and the circulator, and a plurality of balls rollingly fitted in the spaces defined by the load ball rolling grooves of the slider body and the load ball rolling grooves of the guide rail and in the non-load ball circulating paths in the circulator, in which the dust-proofing structure, according to the present invention, provides both end portions of the holding plate, as viewed in the direction of length thereof, are bent at right angles, thus forming protrusions, and seal members having sealing protrusions are formed on the outer surfaces of the protrusions so that the sealing protrusions are fitted in the load ball rolling grooves of the guide rail to sealingly close gaps formed between the guide rail and the slider mounted in the guide rail.

The seal members provided on the ends of the holding plate sealingly close the gaps between the guide rail and the slider, and the load ball rolling grooves formed in the inner surfaces of the side walls of the guide rail. Hence, dust stuck on the guide rail is wiped off while the slider is being moved, thus not entering the slider, and the lubricant is prevented from splashing out of the slider.

The nature, utility and principle of the invention will be more clearly understood from the following detailed description and the appended claim when read in conjunction with the accompanying drawings.

BRIEF DESCRIPTION OF THE DRAWINGS

In the accompanying drawings:

FIG. 2 is a perspective view of the miniature linear guide which is formed by assembling the components shown in FIG. 1;

FIG. 3 is a perspective view showing a second embodiment of a holding plate in the miniature linear guide;

FIG. 4 is a perspective view showing a third embodiment of a seal member in the miniature linear guide;

DETAILED DESCRIPTION OF THE PREFERRED EMBODIMENTS

Preferred embodiments of the present invention will be described with reference to the accompanying drawings.

Figure 5:
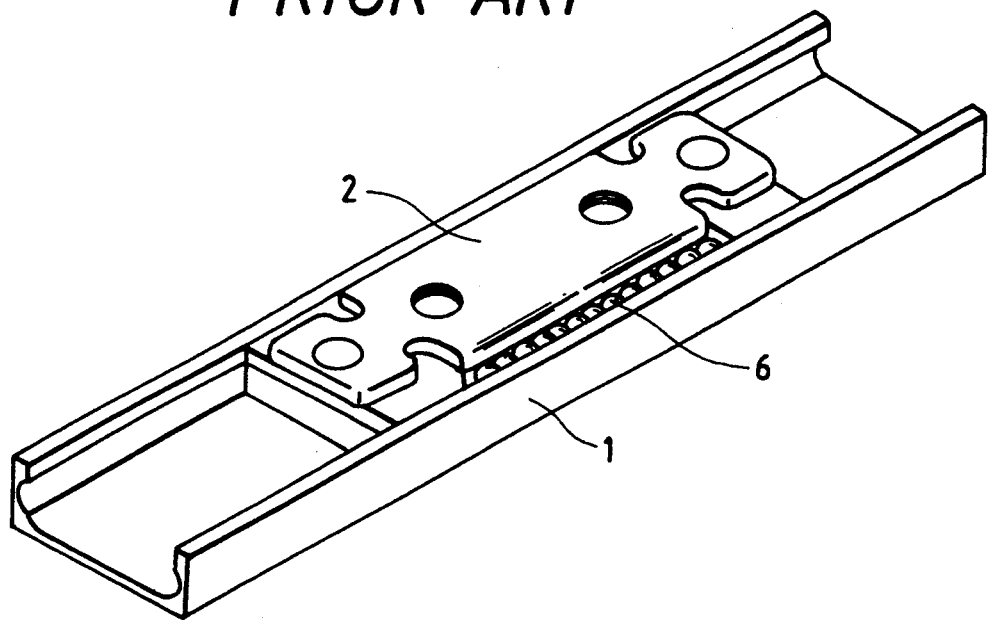
FIG. 5 is a perspective view showing a conventional miniature linear guide.
Figure 6:
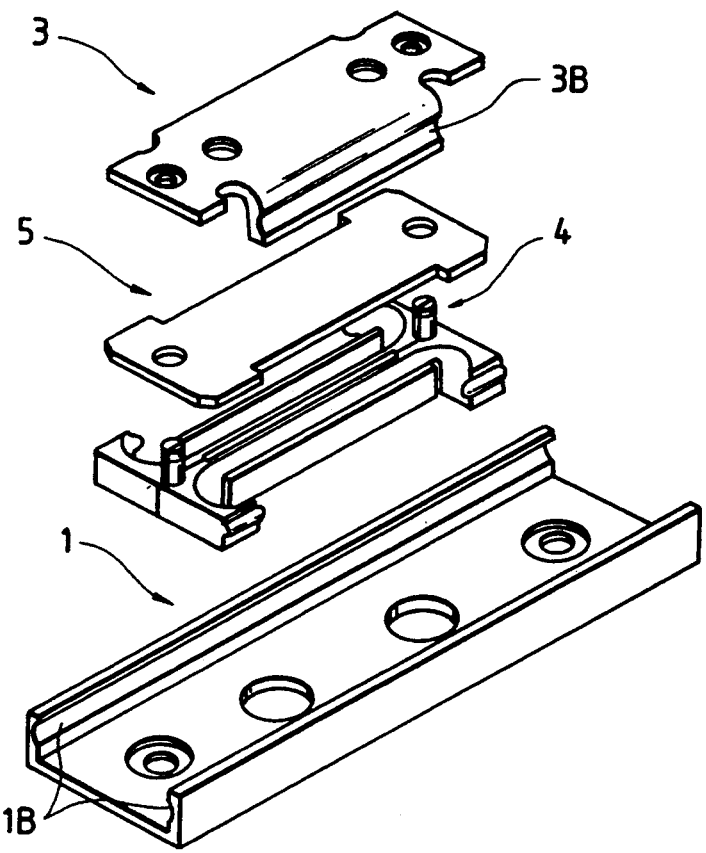
FIG. 6 is a perspective view showing components of the conventional miniature linear guide.

A miniature linear guide, which constitutes a first embodiment of the present invention, will be described with reference to FIGS. 1 and 2, in which parts corresponding functionally to those which have been described with reference to FIGS. 5 and 6 are therefore designated by the same reference numerals or characters.

Figure 1:
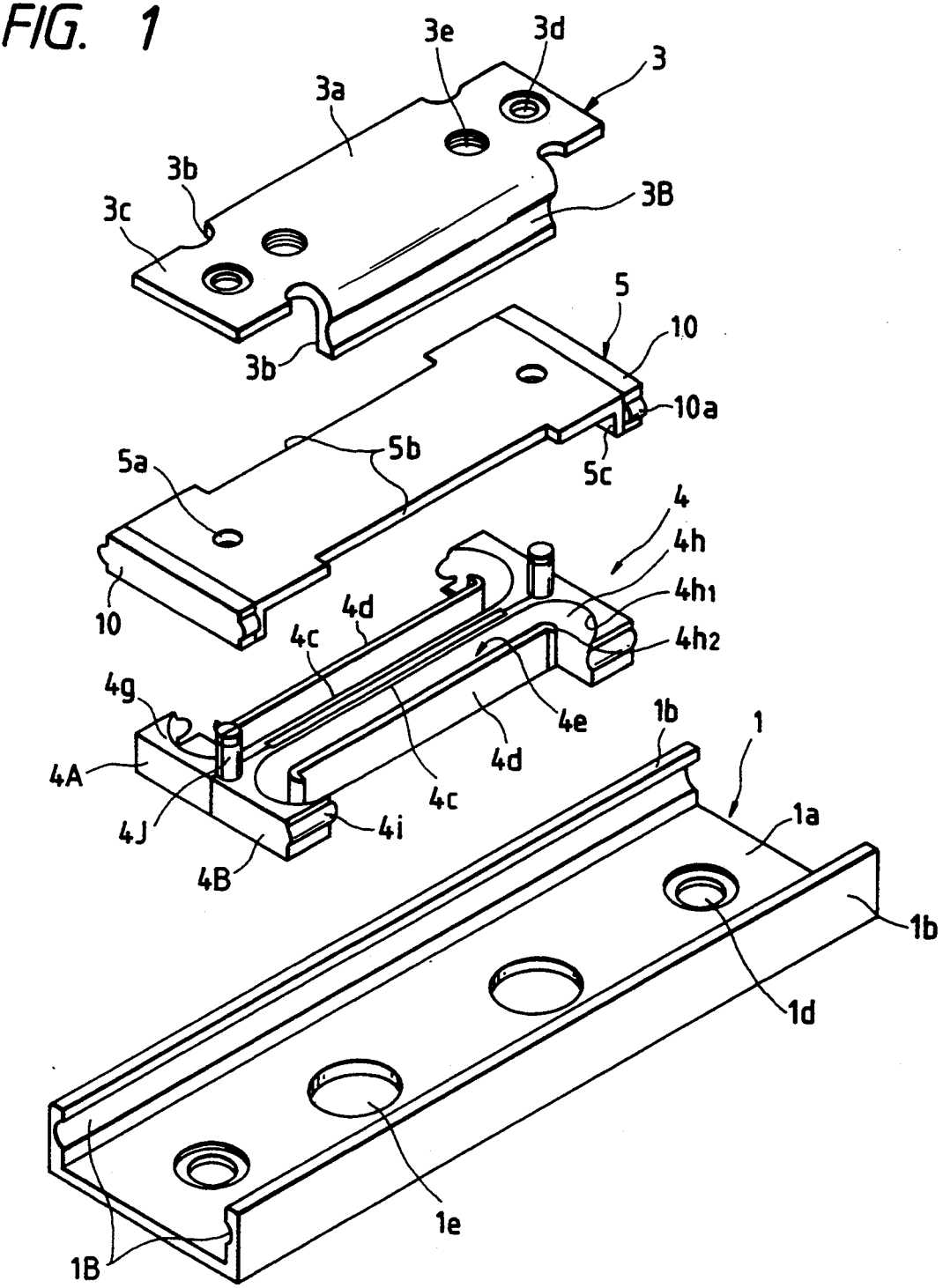
FIG. 1 is an exploded perspective view showing components of a miniature linear guide, which constitutes a first embodiment of the present invention.

As shown in FIGS. 1 and 2, the miniature linear guide provides: a guide rail 1 substantially U-shaped in section; and a slider 2 slidably fitted in the guide rail 1.

The guide rail 1 is formed by pressing a steel plate so that two side walls 1b and 1b are extended upwardly from both edges of a bottom plate 1a which is elongated axially, and load ball rolling grooves 1B and 1B are formed in the inner surfaces of the two side walls 1b and 1b, respectively, so that they are extended axially. The load ball rolling grooves 1B and 1B are in parallel with each other, and are Gothic-arch-shaped (or substantially semi-circular) in section. Bolt-inserting countersunk holes 1d and accuracy measuring holes 1e are formed in the bottom plate 1a. The holes 1d are used for mounting the guide rail 1 on a certain member with bolts to use the miniature linear guide.

The slider 2 provides: a slider body 3 made of a thin steel plate; a circulator 4 of synthetic resin; and a holding plate 5 made of a thin steel plate.

The slider body 3 is substantially U-shaped in section; that is, it includes a top plate 3a extended axially; and two side walls 3b and 3b extended downwardly from both edges of the top plate 3a so that the side walls 3b are in parallel with each other. The outer width; i.e., the distance between the outer surfaces of the two side walls 3b and 3b is slightly smaller than the inner width; i.e., the distance between the inner surfaces of the two side walls 1b and 1b of the guide rail 1. The side walls 3b and 3b of the slide body 3 are set between the side walls 1b and 1b of the guide rail 1. Load ball rolling grooves 3B and 3B are formed in the outer surfaces of the side walls 3b and 3b of the slider body 3, respectively, so that they are extended axially. The load ball rolling grooves 3B and 3B are Gothic-arch-shaped (or substantially half-circular) in section similarly as in the case of the load ball rolling grooves 1B and 1B of the guide rail 1. The top plate 3a has two end portions 3c and 3c which are extended longitudinally over the side walls 3b and 3b (hereinafter referred to as "extended portions 3c and 3c", when applicable). Counter-sunk holes 3d and 3d are formed in the extended portions 3c and 3c, respectively, to engage the slider body 3 with the circulator 4. In addition, mounting threaded holes 3e are formed in the top plate 3a between the counter-sunk holes 3d and 3d, to mount a member such as a table on the slider 2.

The circulator 4 is made up of two symmetrical members 4A and 4B which are formed by injection molding. The symmetrical members 4A and 4B are provided back to back as shown in FIG. 1. The symmetrical members 4A and 4B has an barrel angle-shaped in section. The barrel includes center walls 4c, and side walls 4d on both sides of the center walls 4c so that non-load ball circulating grooves 4e and 4e are axially extended. The barrel of the symmetrical members 4A and 4B is fitted between the side walls 3b and 3b of the slider body 3. Each of end portions of the barrel has flange portions 4g projected to right and left. Semi-circularly curved grooves 4h are formed in the flange portions 4g so that they are communicated with the non-load ball circulating grooves 4e and 4e. The non-load ball circulating grooves 4e and the semi-circularly curved grooves 4h form non-load ball circulating paths.

The semi-circularly curved grooves 4h have outer arcuate surfaces $4h_1$ as shown in FIG. 1. In correspondence to the outer arcuate surfaces $4h_1$, inner arcuate surfaces $4h_2$ are formed on the side walls 4d and 4d at the ends, so that the balls are smoothly guided. Ball scooping pawls 4i are formed on the sides of the flange portions 4g in which the curved grooves 4h are opened (to communicate with the load ball rolling grooves 1B of the guide rail 1) so as to smoothly guide the balls during operation. Circular-cylinder-shaped engaging protrusions 4j are formed on the upper surfaces of the flange portions 4g of the circulator 4. The engaging protrusions 4j are formed into the circular cylinder shape by combining semi-circular cylinders provided on both ends of the two symmetrical members 4A and 4B.

The holding plate 5 is used to hold the two members 4A and 4B of the circulator 4 as one unit. The holding plate 5 has two through-holes 5a in both end portions, into which the circular-cylinder-shaped engaging protrusions 4j of the circulator 4 are inserted. Furthermore, the holding plate 5 has cut-outs 5b in the right and left edge portions, which are engaged with the two side walls 3b of the slider body 3. In addition, both end portions of the holding plate 5, as viewed in the direction of length thereof, are bent at right angles, thus forming protrusions 5c. Seal members (or side seals) 10 of synthetic rubber are provided on the outer surfaces of the protrusions 5c by welding, bonding or fitting.

Each of the seal members 10 is in the form of a rectangular strip, and has sealing protrusions 10a at both ends as viewed in the lengthwise direction. The sealing protrusions 10a are formed arcuate so as to sealing close the gaps between the guide rail 1 and the slider 2.

The slider 2 is mounted on the guide rail 1 as follows:

The pair of symmetrical members 4A and 4B are set back to back to form the circulator 4. The engaging protrusions 4j of the circulator 4 thus formed are inserted into the throughholes 5a of the holding plate 5, so that the holding plate 5 is mounted on the circulator 4. The slider body 3 is mounted on the holding plate 5 while the engaging protrusions 4j of the circulator 4 are inserted into the counter-sunk holes 3d formed in the extended portions 3c of the slider body 3.

Thereafter, the heads of the engaging protrusions 4j appearing above the slider body 3 are welded to the slider body 3 so that the slider body 3 is combined through the holding plate 5 with the circulator 4. As a result, the non-load ball circulating grooves 4e and the curved grooves 4h of the circulator 4 are covered with the holding plate 5, and at the open ends of the curved grooves 4h, the inner arcuate surfaces $4h_2$ are connected smooth to the load ball rolling grooves 3B of the slider body 3. Thus, the non-load ball circulating paths have been formed which are smooth having no steps.

The slider 2 thus assembled is loosely fitted in the guide rail 1, and a number of balls are fitted in the non-load ball circulating paths and in the spaces defined by the load ball rolling grooves 1B of the guide rail 1 and the grooves 3B of the slider 2 confronted with the grooves 1B.

At the open ends of the curve grooves 4h, the outer arcuate surfaces $4h_1$ are connected through the ball scooping pawls protruded from the ends of the flange portions 4g of the circulator 4 to the bottoms of the load ball rolling grooves 1B of the guide rail 1. Hence, the balls are smoothly circulated.

When the slider 2 is engaged with the guide rail 1 in the above-described manner, small gaps are formed between them. However, the gaps are sealingly closed by the seal members 10 of the slider 2.

The operation of the miniature linear guide thus constructed will be described.

It is assumed that the guide rail 1 has been fixedly mounted on the machine base (not shown) with bolts, while the slide 2 on the machine table (not shown).

As the machine table is moved, the slider 2 is moved axially along the guide rail 1. In this operation, the balls 6 in the spaces defined by the load ball rolling grooves 1B of the guide rail 1 and those 3B of the slider body 3 are circulated as follows: The balls 6 are moved in the same direction as the slider 2 at a speed lower than the speed of movement of the slider 2 while being rolled. When the balls reach the flange portions 4g, on one side, of the circulator 4, they are scooped up by the ball scooping pawls 4i into the curved grooves 4h, where they are caused to make a U-turn. Thereafter, the balls are moved along the non-load ball rolling grooves 4e to reach the curved grooves 4h on the other side, where they are caused to make a U-turn again, thus returning into the spaces defined by the load ball rolling grooves 1B and 3B. This ball circulation is repeatedly carried out.

During the movement of the slider 2, both sides of each of the seal members 10 of the slider 2 are in slide contact with the inner surfaces of the side walls 1b and 1b of the guide rail 1, which serve as guide surfaces, and the surfaces of the load ball rolling grooves 1B, while the lower surfaces of the seal members 10 are in slide contact with the bottom plate 1a of the guide rail 1, so that the gaps between the guide rail 1 and the slider 2 are sealingly closed thereby. Hence, the entrance of dust or the like into the slider 2 is prevented. Therefore, even if the linear guide is used in a dusty circumference, its operation is maintained satisfactory for a long time.

As shown in FIG. 2, some of the balls 6 are exposed between the guide rail and the slider 2; that is, there are gaps between the guide rail and the slider. However, the gaps cause no trouble, because they are substantially closed, for instance, with a table connected to the slider 2.

The seal members 10 prevent the lubricant from splashing out of the slider 2; in other words, they serve to hold the lubricant inside the slider 2, which contributes to increase of the service life of the linear guide.

FIG. 3 shows a second embodiment of the above-described holding plate 5.

Similarly as in the case of the above-described holding plate, both end portions of the holding plate 5 as viewed in the longitudinal direction are bent at right angles, thus providing protrusions 5c extended downwardly. The holding plate 5 has reinforcing portions 5d which are extended outwardly from both side edges of the holding plate 5 adjacent to the protrusions 5c along the folding lines of the protrusions 5c. The reinforcing portions 5d are curved downwardly to support the protrusions 5c through the inner surface; i.e., to reinforce the protrusions 5c. Similarly as in the above-described holding plate, the seal members 10 are fixedly bonded to the outer surfaces of the protrusions 5c thus reinforced.

With the second embodiment, the seal members 10 are more positively mounted on the protrusions 10. Hence, even if the seal members 10 are repeatedly reciprocated on the inner surfaces of the guide rail 1 for a long period of time, the mounting angle of the seal members 10 is maintained unchanged; that is, the seal members 10 is stable in sealing effect for a long time.

FIG. 4 shows a third embodiment of the seal member 10. That is, each of the sealing protrusions 10a of the seal member 10 is made up of a plurality of sealing lips R set side by side. The plurality of sealing lips R are brought into slide contact with the surface of the respective load ball rolling groove 1B of the guide rail 1. In this case, the groove surface is more positively wiped off than in the case where the sealing protrusion 10a is a single lip; that is, the third embodiment provides a higher sealing effect. In addition, with the third embodiment, the lubricant is held in the slider more positively.

As described above, in the miniature linear guide providing the guide rail and the slider which is fitted in the guide rail so that the slider is axially movable through a number of balls, the slider is made up of the slider body, the circulator which is fitted in the slider body and has the non-load ball circulating paths extended axially, and the holding plate interposed between the slider body and the circulator. The slider has the dust-proofing structure according to the present invention in which both end portions of the holding plate, as viewed in the direction of length thereof, are bent at right angles, to provide the protrusions. The seal members having the sealing protrusions are formed on the outer surfaces of the protrusions of the holding plate so that the sealing protrusions are fitted in the load ball rolling grooves of the guide rail to sealingly close gaps formed between the slider and the guide rail. Hence, the entrance of dust into the slider through the gaps between the slider and the guide rail is positively prevented, and the lubricant is prevented from splashing out of the slider.

While there has been described in connection with the preferred embodiments of the present invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. A miniature linear guide comprising:
    a guide rail U-shaped in section which is extended axially, said guide rail including a first load ball rolling groove formed on an inner surface of a side wall of said guide rail and extended axially;
    a slider including:
        a slider body U-shaped in section which is adapted to be fitted in said guide rail, said slider body including a second load ball rolling groove formed on an outer surface of a side wall of said slider body and confronted with said first load ball rolling groove of said guide rail;
        a circulator having a non-load ball circulating path which is extended axially, said circulator being fitted in said slider body; and
        a holding plate interposed between said slider body and said circulator; and
    a plurality of balls fitted to roll in a space defined by said first and second load ball rolling grooves and said non-load ball circulating path of said circulator; and
    a dust-proofing structure including:
        a protrusion formed in an axial end portion of said holding plate and bent substantially at right angle to an upper surface of said holding plate; and
        a seal member having a sealing protrusion formed on an outer surface of said protrusion so that said sealing protrusion is fitted in said first load ball rolling groove of said guide rail to sealingly close a gap formed between said guide rail and said slider mounted in said guide rail.

2. The miniature linear guide of claim 1, wherein said holding plate includes a reinforcing portion extended outwardly from a side edge of said holding plate adjacent to said protrusion and curved downwardly along a folding line of said protrusion.

3. The miniature linear guide of claim 1, wherein said sealing protrusion of said seal member is made up of a plurality of sealing lips formed side by side.

* * * * *